United States Patent
Shim et al.

(10) Patent No.: US 10,431,815 B2
(45) Date of Patent: Oct. 1, 2019

(54) CARBONACEOUS MATERIAL, ANODE ACTIVE MATERIAL INCLUDING THE SAME, LITHIUM BATTERY INCLUDING THE ANODE ACTIVE MATERIAL, AND METHOD OF PREPARING THE CARBONACEOUS MATERIAL

(71) Applicant: Samsung SDI Co., Ltd., Yongin-si, Gyeonggi-do (KR)

(72) Inventors: Jaehyun Shim, Yongin-si (KR); Kisoo Lee, Yongin-si (KR); Jeongho Lee, Yongin-si (KR); Myoungseok Lee, Yongin-si (KR); Jeongmin Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 78 days.

(21) Appl. No.: 15/366,848

(22) Filed: Dec. 1, 2016

(65) Prior Publication Data
US 2017/0162869 A1 Jun. 8, 2017

(30) Foreign Application Priority Data

Dec. 3, 2015 (KR) .......................... 10-2015-0171432

(51) Int. Cl.
*H01M 4/36* (2006.01)
*H01M 10/0525* (2010.01)
(Continued)

(52) U.S. Cl.
CPC ............ *H01M 4/366* (2013.01); *C01B 32/20* (2017.08); *H01M 4/133* (2013.01);
(Continued)

(58) Field of Classification Search
None
See application file for complete search history.

(56) References Cited

U.S. PATENT DOCUMENTS 6,482,547 B1 * 11/2002 Yoon ..................... H01M 4/133
429/218.1
2007/0194158 A1 8/2007 Zaghib et al.
(Continued)

FOREIGN PATENT DOCUMENTS

| JP | 6-187986 A | 7/1994 |
|---|---|---|
| WO | WO 2014/157630 A1 | 10/2014 |
| WO | WO2014157630 | * 10/2014 |

OTHER PUBLICATIONS

Zheng et al. "Two-Dimensional Porous Carbon: Synthesis and Ion-Transport Properties". Advanced Materials. 2015, 27, 5388-5395. (Year: 2015).*

(Continued)

*Primary Examiner* — Christopher P Domone
(74) *Attorney, Agent, or Firm* — Lewis Roca Rothgerber Christie LLP

(57) ABSTRACT

A carbonaceous material, an anode active material including the carbonaceous material, a lithium battery including the anode active material, and a method of preparing the carbonaceous material are provided. The carbonaceous material includes: a core including graphite; and a shell on the core and including an amorphous carbonaceous material, wherein the carbonaceous material is a single body.

16 Claims, 20 Drawing Sheets
(5 of 20 Drawing Sheet(s) Filed in Color)

(51) Int. Cl.
  *H01M 4/587* (2010.01)
  *H01M 4/133* (2010.01)
  *H01M 4/1393* (2010.01)
  *H01M 4/62* (2006.01)
  *C01B 32/20* (2017.01)
  *H01M 4/02* (2006.01)

(52) U.S. Cl.
  CPC ......... *H01M 4/1393* (2013.01); *H01M 4/587* (2013.01); *H01M 4/62* (2013.01); *H01M 4/625* (2013.01); *H01M 10/0525* (2013.01); *C01P 2006/40* (2013.01); *H01M 2004/021* (2013.01); *H01M 2004/027* (2013.01)

(56) References Cited

U.S. PATENT DOCUMENTS

2011/0002086 A1* 1/2011 Feaver .................. H01M 4/583
                                                                361/502
2016/0056452 A1* 2/2016 Tamura ................. H01M 4/587
                                                                429/231.8

OTHER PUBLICATIONS

EPO Office Action dated Nov. 28, 2017, for corresponding European Patent Application No. 16201560.6 (4 pages).

EPO Extended Search Report dated Apr. 18, 2017, for corresponding European Patent Application No. 16201560.6 (7 pages).

Teng, Hsisheng, et al., "Transformation of mesophase pitch into different carbons by heat treatment and KOH etching", Microporous and Mesoporous Materials 50, accepted Sep. 7, 2001, pp. 53-60, Department of Chemical Engineering, National Cheng Kung University, Tainan, Taiwan.

Feng-Chin, Wu, et al., "Comparisons of pore properties and absorption performance of KOH-activated and steam-activated carbons", Microporous and Mesoporous Materials 80, accepted Dec. 2, 2004, pp. 95-106, Department of Chemical Engineering, National United University, Miao-Io, Taiwan, et al.

Cheng, Qian, et al., "KOH etched graphite for fast chargeable lithium-ion batteries", Journal of Power Sources 284, accepted Mar. 5, 2015, pp. 258-263, Smart Energy Research Laboratories, NEC Corporation, Tsukuba, Ibaraki, Japan.

* cited by examiner

CARBONACEOUS MATERIAL, ANODE ACTIVE MATERIAL INCLUDING THE SAME, LITHIUM BATTERY INCLUDING THE ANODE ACTIVE MATERIAL, AND METHOD OF PREPARING THE CARBONACEOUS MATERIAL

CROSS-REFERENCE TO RELATED APPLICATION

This application claims priority to and the benefit of Korean Patent Application No. 10-2015-0171432, filed on Dec. 3, 2015, in the Korean Intellectual Property Office, the entire content of which is incorporated herein by reference.

BACKGROUND

1. Field

One or more exemplary embodiments relate to a carbonaceous material, an anode active material including the same, a lithium battery including the anode active material, and a method of preparing the carbonaceous material.

2. Description of the Related Art

Lithium batteries, and for example, lithium-ion batteries, are widely used, in applications ranging from portable devices, hybrid vehicles (HVs), plug-in hybrid electric vehicles (PHVs), and electric vehicles (EVs) to smart grid technologies.

Graphite is used as an anode material of a lithium ion battery. However, due to having a narrow interplanar spacing of about 0.335 nm, insufficient (or an unsatisfactory number of) intercalation sites of lithium ions on the basal plane, and a long diffusion region between graphite interlayers, graphite may provide limited (or unsatisfactory) charge/discharge characteristics when used as an anode active material.

Therefore, there still are needs for a carbonaceous material having a novel structure having improved capacity and charge/discharge characteristics, an anode active material including the carbonaceous material, a lithium battery including the anode active material, and a preparation method of the carbonaceous material.

SUMMARY

One or more exemplary embodiments include a carbonaceous material having improved capacity and charge/discharge characteristics.

One or more exemplary embodiments include an anode active material including the carbonaceous material.

One or more exemplary embodiments include a lithium battery including an anode including the anode active material.

One or more exemplary embodiments include a method of preparing the carbonaceous material.

Additional aspects of embodiments will be set forth in part in the description which follows and, in part, will be apparent from the description, or may be learned by practice of the presented embodiments.

According to one or more exemplary embodiments, a carbonaceous material includes: a core including graphite; and a shell on the core and including an amorphous carbonaceous material, wherein the carbonaceous material is a single body.

According to one or more exemplary embodiments, an anode active material includes the above-described carbonaceous material.

According to one or more exemplary embodiments, a lithium battery includes: an anode including the above-described anode active material; a cathode; and an electrolyte located between the anode and the cathode.

According to one or more exemplary embodiments, a method of preparing a carbonaceous material includes: adding graphite to an alkaline aqueous solution and stirring a resulting solution to obtain a mixture; and washing the mixture with a solvent and drying a resulting mixture to obtain the above-described carbonaceous material.

BRIEF DESCRIPTION OF THE DRAWINGS

These and/or other aspects will become apparent and more readily appreciated from the following description of the exemplary embodiments, taken in conjunction with the accompanying drawings in which.

Figure 1:
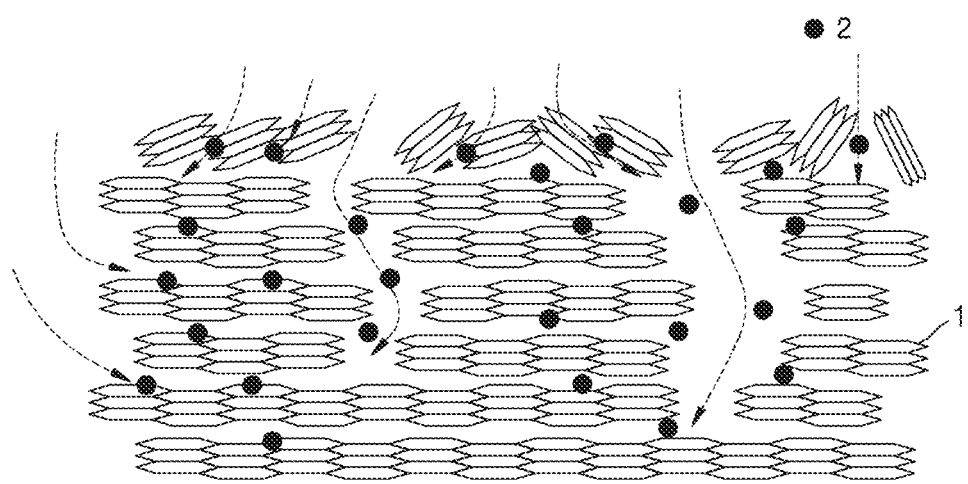
FIG. 1 is a schematic view illustrating a structure of a carbonaceous material according to an embodiment and a diffusion path of lithium ions therein.

The patent or application file contains at least one drawing executed in color. Copies of this patent or patent application publication with color drawing(s) will be provided by the Office upon request and payment of the necessary fee.

DETAILED DESCRIPTION

Reference will now be made in more detail to exemplary embodiments of a carbonaceous material, an anode active material including the carbonaceous material, a lithium battery including the anode active material, and a method of preparing the carbonaceous material, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

According to an aspect of an embodiment of the present disclosure, a carbonaceous material includes: a core including graphite; and a shell disposed on the core and including an amorphous carbonaceous material, wherein the carbonaceous material is a single body.

As used herein, the term "single body" refers to a monocomponent body including (or consisting of) a single (sole) component, and is distinct from a composite including (or consisting of) different elements. Though including (or consisting of) a single (sole) component, the single body may partially have a change in mechanical characteristics and/or chemical characteristics As used herein, the expression "disposed" may refer to any suitable manner of placing an element next to and/or adjacent to another element (e.g., including attaching an element to another element, or locating an element on another element).

Graphite may be classified into either artificial graphite or natural graphite. Artificial graphite is mostly used due to its more stable lifetime behavior as compared to natural graphite. However, both natural graphite and artificial graphite may lead to lithium plating or side reaction products on (or at) a surface of an anode plate during rapid charging, and consequentially, deteriorate battery performance in terms of capacity and/or lifetime characteristics.

In some embodiments, the carbonaceous material may be artificial graphite.

Artificial graphite may have a dual structure including hexagonal and rhombohedral structures resulting from its manufacturing process, wherein a stacking fault at an interface between the two structures may suppress or reduce diffusion of lithium ions.

In some embodiments, the carbonaceous material may have a core-shell structure as described above, e.g., including a graphite core and an amorphous carbonaceous shell disposed on the core, wherein the carbonaceous material may be a single body (e.g., a sole or unitary body). The carbonaceous material having such a structure may reduce the rhombohedral structure of graphite, and thus, improve diffusion of lithium ions at the interface between the two hexagonal and rhombohedral structures. A lithium battery having improved capacity and charge/discharge characteristics may be provided using the carbonaceous material as an anode active material of the lithium battery.

In some embodiments, the carbonaceous material may be an etched porous carbonaceous material. The etching may be performed using an alkaline aqueous solution such as, for example, a potassium hydroxide aqueous solution or a sodium hydroxide aqueous solution. The etching may exclude thermal treatment (e.g., the etching may be performed with the proviso that external heat is not applied to the carbonaceous material during the etching at about 90° C. or less, for example, at about 25° C. to about 90° C.). For example, the etching may be performed at room temperature (e.g., about 25° C.).

Generally, etched porous carbonaceous materials may be prepared using thermal treatment, so that an etchant (for example, an alkaline solution) used for etching may remain in the carbonaceous material or be deposited on a surface of the porous carbonaceous material. However, when such a general etched porous carbonaceous material is used as an anode active material of a lithium battery, the lithium battery may have poor lifetime and charge/discharge characteristics.

However, in some embodiments, the carbonaceous material may include a reduced amount of an etchant remaining in the carbonaceous material or remaining deposited on a surface of the carbonaceous material due to the exclusion of thermal treatment. When the carbonaceous material according to an embodiment is used as an anode active material of a lithium battery, the lithium battery may have improved capacity and charge/discharge characteristics.

FIG. 1 is a schematic view illustrating a structure of a carbonaceous material 1 according to an embodiment and a diffusion path of lithium ions therein.

Referring to FIG. 1, the carbonaceous material 1 may be a carbonaceous material including a core of graphite and a shell of an amorphous carbonaceous material disposed on the core.

The carbonaceous material 1 may include a plurality of micropores. The micropores may extend from a surface of the carbonaceous material 1 toward an inner region of the carbonaceous material 1, and may serve as a path of diffusion of lithium ions 2 from the surface of the carbonaceous material 1 into the inner region of the micropores.

The carbonaceous material may include one or more nanoholes. The term "nanoholes" refers to nanoscale holes of missing infinite carbon atoms in the carbonaceous material. Each nanohole may serve as an intercalation or deintercalation site of lithium ions during charging/discharging of a lithium battery thus to facilitate intercalation or deintercalation of lithium ions. Therefore, a lithium battery including the carbonaceous material as an anode active material may have improved electron conductivity and charging rate at a high rate.

The carbonaceous material may include a potassium hydroxide nanocrystal on (or at) a surface thereof.

The carbonaceous material may have a surface pKa value of about 11 or greater. For example, the carbonaceous material may have a surface pKa value of about 11 to about 14.

The amount of potassium cations ($K^+$) in (or on or at) the surface of the carbonaceous material may be from about 0.001 wt % to about 0.003 wt % based on a total weight of the carbonaceous material. For example, the amount of potassium cations (K$^+$) in (or on or at) the surface of the carbonaceous material may be from about 0.002 wt % to about 0.003 wt %, and in some embodiments, from about 0.0021 wt % to about 0.0028 wt %, and in some other embodiments, from about 0.0022 wt % to about 0.0026 wt %, based on a total weight of the carbonaceous material.

When using the carbonaceous material that includes a reduced amount of potassium hydroxide measured as potassium cations (as described above) within any of the above-described ranges, as an anode active material, a lithium battery may have improved capacity and charge/discharge characteristics.

In some embodiments, the carbonaceous material may have a Brunauer-Emmett-Teller (BET) specific surface area of about 6.0 to about 10.0 m$^2$/g. For example, the carbonaceous material may have a BET specific surface area of about 7.2 to about 9.0 m$^2$/g, and in some embodiments, about 7.4 to about 8.5 m$^2$/g. The carbonaceous material may have a BET specific surface area within these ranges due to an increased number of nanoholes in the surface of the carbonaceous material, and consequently may have improved charge/discharge characteristics in terms of rate characteristics, rapid charging rate characteristics, and lifetime characteristics. In some embodiments, the carbonaceous material may have a larger BET specific surface area by about 5 to about 45% than that of carbonaceous materials without nanoholes.

In some embodiments, a ratio of intensities of a D peak at about 1360 cm$^{-1}$ to a G peak at about 1580 cm$^{-1}$ (D/G) in Raman spectra of the carbonaceous material may be about 0.04 to about 0.14. For example, a ratio of intensities of the D peak at about 1360 cm$^{-1}$ to the G peak at about 1580 cm$^{-1}$ (D/G) in Raman spectra of the carbonaceous material may be about 0.05 to about 0.10, and in some embodiments, about 0.06 to about 0.08.

In some embodiments, an interplanar spacing ($d_{002}$) of the (002) plane of the carbonaceous material as measured by X-ray diffraction analysis may be about 3.350 Å to about 3.355 Å.

According to another aspect of embodiments of the present disclosure, an anode active material includes a carbonaceous material according to any of the above-described embodiments.

According to another aspect of embodiments of the present disclosure, a lithium battery includes an anode including the anode active material, a cathode, and an electrolyte disposed between the anode and the cathode.

First, the anode may be manufactured as follows.

For example, an anode active material, a conducting agent, a binder, and a solvent may be mixed together to prepare an anode slurry composition, which is then directly coated on an anode current collector, and then dried to manufacture an anode including an anode active material layer thereon. In some embodiments, the anode slurry composition may be cast on a separate support to form an anode active material layer, which is then separated from the support and laminated on an anode current collector to manufacture an anode including an anode active material layer thereon.

The anode active material used to form the anode of the lithium battery according to an embodiment may be the above-described anode active material according to an embodiment, but the present disclosure is not limited thereto.

In some embodiments, the anode active material used to form the anode of the lithium battery according to an embodiment may be any anode active materials for lithium batteries available in the art, and not only the above-described anode active material according to an embodiment. For example, the anode active material may include at least one selected from a lithium metal, a metal that is alloyable with lithium, a transition metal oxide, a non-transition metal oxide, and a carbonaceous material.

Non-limiting examples of the metal alloyable with lithium include Si, Sn, Al, Ge, Pb, Bi, Sb, a Si—Y' alloy (where Y' may be an alkali metal, an alkali earth metal, a Group 13 element, a Group 14 element, a transition metal, a rare earth element, or a combination thereof except for Si (e.g., with the proviso that Y' is not Si)), and a Sn—Y' alloy (where Y' may be an alkali metal, an alkali earth metal, a Group 13 element, a Group 14 element, a transition metal, a rare earth element, or a combination thereof except for Sn (e.g., with the proviso that Y' is not Sn)). The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Non-limiting examples of the transition metal oxide include a lithium titanium oxide, a vanadium oxide, and a lithium vanadium oxide.

Non-limiting examples of the non-transition metal oxide include $SnO_2$ and $SiO_x$ (wherein 0<x<2).

Non-limiting examples of the carbonaceous material include crystalline carbon, amorphous carbon, and mixtures thereof. Non-limiting examples of the crystalline carbon include graphite, such as natural graphite or artificial graphite that is in amorphous, plate, flake, spherical, or fibrous form. Non-limiting examples of the amorphous carbon include soft carbon (carbon sintered at low temperatures), hard carbon, meso-phase pitch carbides, and sintered corks.

Non-limiting examples of the conducting agent include carbon black (e.g., acetylene black and/or ketjen black), graphite particulates, natural graphite, artificial graphite, carbon fibers, carbon nanotubes, metallic materials such as copper, nickel, aluminum, silver, or the like in powder, fiber, or tube form, and a conductive polymer such as polyphenylene derivatives. Any suitable conducting agents available in the art may be used.

The binder may be either an aqueous binder or a non-aqueous binder. For example, the binder may be an aqueous binder. The amount of the binder may be in a range of about 0.1 parts to about 5 parts by weight based on 100 parts by weight of a total weight of the anode slurry composition. When the amount of the binder is within this range, the binding strength of the anode to the current collector may be strong (or suitable).

Non-limiting examples of the aqueous binder include styrene-butadiene rubber (SBR), polyvinyl alcohol, carboxymethyl cellulose (CMC), hydroxypropyl cellulose, diacetyl cellulose, and mixtures thereof. SBR as a binder may be dispersible in water to form an emulsion, and does not require an organic solvent. SBR may have strong binding strength, and may be used in a reduced amount, thereby accommodating an increased amount of anode active material, which allows for manufacturing of a lithium battery having improved capacity. The aqueous binder may be used together with water or an aqueous solvent such as an alcoholic solvent (e.g., an alcohol) miscible with water. The aqueous binder may be used together with a thickening agent for viscosity control. For example, the thickening agent may be at least one selected from carboxymethyl cellulose (CMC), hydroxymethyl cellulose, hydroxyethyl cellulose, and hydroxypropyl cellulose. The amount of the thickening agent may be from about 0.8 wt % to about 5 wt %, and in some embodiments, about 1 wt % to about 5 wt %, and in some other embodiments, about 1 wt % to about 2 wt %, based on a total weight of the anode slurry composition. When the amount of the thickening agent is within any of these ranges, coating the anode slurry composition on the current collector may be facilitated without capacity reduction in a lithium battery.

For example, the non-aqueous binder may be at least one selected from polyvinylchloride, polyvinylpyrrolidone, polytetrafluoroethylene, polyvinylidene fluoride, polyethylene, polypropylene, and mixtures thereof. These non-aqueous binders may be used together with a non-aqueous solvent selected from N-methyl-2-pyrrolidone (NMP), dimethylformamide, tetrahydrofuran, and mixtures thereof.

In some embodiments, a plasticizer may be further added, if needed or desired, into the anode slurry composition to form an anode plate including pores.

The amounts of the anode active material, the conducting agent, the binder, and the solvent may be those levels that are generally used in lithium batteries in the art.

The anode current collector may have a thickness of about 3 μm to about 500 μm. The anode current collector is not particularly limited, and may be any suitable material so long as it has an appropriate or suitable conductivity without causing chemical changes in a battery. Examples of the anode current collector include copper, stainless steel, aluminum, nickel, titanium, sintered carbon, copper or stainless steel that is surface-treated with carbon, nickel, titanium or silver, and aluminum-cadmium alloys. In addition, the anode current collector may be processed to have fine irregularities on surfaces thereof so as to enhance or improve adhesive strength of the current collector to the anode active material, and may be used in any of various suitable forms including films, sheets, foils, nets, porous structures, foams, and non-woven fabrics.

For example, the cathode of the lithium battery according to an embodiment may be manufactured as follows. The cathode may be manufactured in the same manner as the anode as described above, except for using a cathode active material, instead of an anode active material. A conducting agent, a binder, and a solvent for an anode slurry composition may be the same as those for the anode described above.

For example, a cathode active material, a conducting agent, a binder, and a solvent may be mixed together to prepare a cathode slurry composition, which is then directly coated on a cathode current collector and dried to manufacture a cathode having a cathode active material layer. In some embodiments, the cathode slurry composition may be cast on a separate support to form a cathode active material layer, which is then separated from the support and laminated on a cathode current collector to manufacture a cathode having a cathode active material layer.

The cathode active material may be a lithium-containing metal oxide, which may be any suitable cathode active materials available in the art. For example, the cathode active material may include at least one lithium composite oxide with (including) a metal selected from cobalt (Co), manganese (Mn), nickel (Ni), and a combination thereof, for example, a compound represented by any one of the following formulae: $Li_aA_{1-b}B'_bD'_2$ (wherein $0.90 \leq a \leq 1$, and $0 \leq b \leq 0.5$); $Li_aE_{1-b}B'_bO_{2-c}D'_c$ (wherein $0.90 \leq a \leq 1$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, $0.001 \leq b \leq 0.1$); $Li_aCoG_bO_2$ (wherein $0.90 \leq a \leq 1$, $0.001 \leq b \leq 0.1$); $Li_aMnG_bO_2$ (wherein $0.90 \leq a \leq 1$, $0.001 \leq b \leq 0.1$); $Li_aMn_2G_bO_4$ (wherein $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A may be Ni, Co, Mn, or a combination thereof; B' may be Al, Ni, Co, Mn, Cr, Fe, Mg, Sr, V, a rare earth element or a combination thereof; D' may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

The compounds listed above as the cathode active material may have a surface coating layer. In some embodiments, a mixture of a compound without a surface coating layer and a compound having a surface coating layer, the compounds being selected from the compounds listed above, may be used. The surface coating layer may include at least one compound of a coating element selected from oxide, hydroxide, oxyhydroxide, oxycarbonate, and hydroxycarbonate of the coating element. The compounds for the surface coating layer may be amorphous or crystalline. The coating element for the surface coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The surface coating layer may be formed using any suitable method that does not adversely affect the physical properties of the cathode active material when a compound of such a coating element is used. For example, the surface coating layer may be formed using a spray coating method, a dipping method, or the like. The method of forming the surface coating layer should be apparent to those of skill in the art, and thus, a detailed description thereof will not be provided here.

The amounts of the cathode active material, the conducting agent, the binder, and the solvent may be those levels that are generally used in lithium batteries in the art. At least one selected from the conducting agent, the binder, and the solvent may not be used depending on the use and the structure of the lithium battery.

The cathode current collector may have a thickness of about 3 μm to about 500 μm. The cathode current collector is not particularly limited, and may be any suitable material so long as it has an appropriate or suitable conductivity without causing chemical changes in a battery. Examples of the cathode current collector include copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine irregularities on surfaces thereof so as to enhance or improve adhesive strength of the current collector to the cathode active material, and may be used in any of various suitable forms including films, sheets, foils, nets, porous structures, foams, and non-woven fabrics.

For example, the cathode of the lithium battery according to an embodiment may have a mixture density of at least about 2.0 g/cc.

The cathode and the anode may be separated from one another by a separator. Any suitable separator that is available in the art for lithium batteries may be used. For example, the separator may have low resistance to migration of ions in an electrolyte and a high electrolyte-retaining ability. Examples of the separator include glass fiber, polyester, Teflon, polyethylene, polypropylene, polytetrafluoroethylene (PTFE), and a combination thereof, each of which may be a nonwoven fabric or a woven fabric. The separator may have a pore diameter of about 0.01 to about 10 μm and a thickness of about 5 to about 300 μm.

In some embodiments, the electrolyte of the lithium battery according to an embodiment may be a lithium salt-containing non-aqueous electrolyte. A lithium salt-containing non-aqueous electrolyte may include a non-aqueous electrolyte solution and a lithium salt. The non-aqueous electrolyte may be a non-aqueous electrolyte, an organic solid electrolyte, or an inorganic solid electrolyte.

Examples of the non-aqueous liquid electrolyte include any of suitable aprotic organic solvents such as N-methyl-2-pyrrolidone, propylene carbonate, ethylene carbonate (EC), butylene carbonate, dimethyl carbonate, diethyl carbonate (DEC), γ-butyrolactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte are polyethylene derivatives, polyethylene oxide derivatives, polypropylene oxide derivatives, phosphoric acid ester polymers, poly agitation lysine, polyester sulfide, polyvinyl alcohols, PVDF, or polymers containing ionic dissociation groups.

Non-limiting examples of the inorganic solid electrolyte are nitrides, halides, sulfates, or silicates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any suitable lithium salt that is soluble in the above-mentioned non-aqueous electrolyte. For example, the lithium salt may be at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenylborate, imides, and combinations thereof.

In some embodiments, the lithium battery may be a lithium primary battery or a lithium secondary battery. Lithium secondary batteries may be classified as lithium ion secondary batteries, lithium ion polymer secondary batteries, or lithium polymer secondary batteries, according to the type (or kind) of separator and/or electrolyte included therein. Lithium secondary batteries may be classified as cylindrical type (or kind), rectangular type (or kind), coin type (or kind), or pouch type (or kind), according to the shape thereof. Lithium secondary batteries may also be classified as either bulk type (or kind) or thin film type (or kind), according to the size thereof.

Methods of manufacturing such lithium batteries should be apparent to those of ordinary skill in the art, and therefore, a detailed description thereof will not be recited here.

Figure 2:
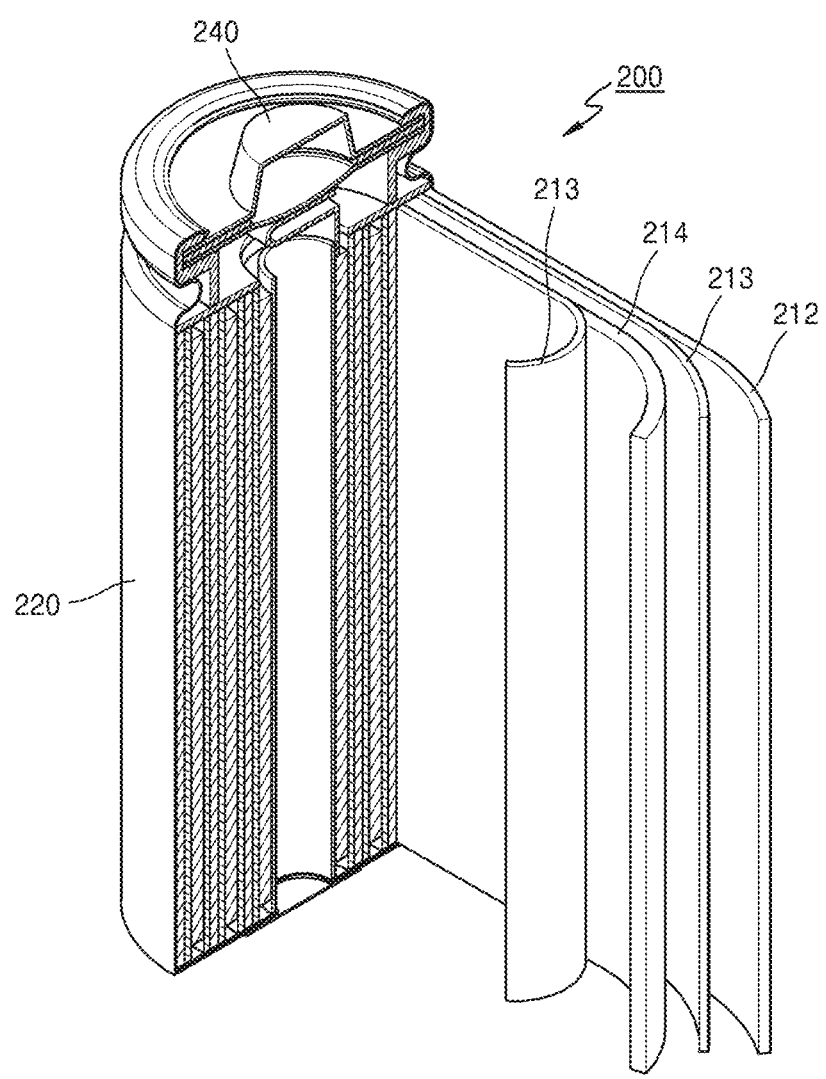
FIG. 2 is a schematic view illustrating a structure of a lithium secondary battery according to an embodiment.

FIG. 2 is a schematic view illustrating a structure of a lithium secondary battery 200 according to an embodiment.

Referring to FIG. 2, the lithium secondary battery 200 may include a cathode 214, a separator 213, and an anode 212. The cathode 214, the separator 213, and the anode 212 of the lithium secondary battery 200 may be wound or folded, and then encased in a battery case 220. Subsequently, an organic electrolyte may be injected into the battery case 220, followed by sealing with a cap assembly member 240, thereby completing the manufacturing of the lithium secondary battery 200. The battery case 220 may have a cylindrical, rectangular, or thin-film shape. For example, the lithium secondary battery 200 may be a large thin-film type (or kind of) battery. The lithium secondary battery 200 may be, for example, a lithium ion secondary battery.

The cathode 214, the anode 212, and the separator 213 disposed between the cathode 214 and the anode 212 may form an electrode assembly. The electrode assembly may be stacked on another electrode assembly to form a bicell structure, which may then be impregnated with an organic liquid electrolyte. The resultant may be accommodated in a pouch and then sealed, thereby completing the manufacture of a lithium ion polymer secondary battery.

In some embodiments, a plurality of such battery assemblies may be stacked upon one another to form a battery pack. The battery pack may be applicable in any suitable device that can utilize a high capacity and high-power output, for example, laptop computers, smart phones, electric tools, and electric vehicles.

In some embodiments, the lithium secondary battery 200 may be applicable in electric vehicles (Evs) such as, for example, hybrid vehicles (HVs), including plug-in hybrid electric vehicles (PHEVs).

According to another aspect of an embodiment, a method of preparing a carbonaceous material includes: adding graphite to an alkaline aqueous solution and stirring a resulting solution to obtain a mixture; and washing the mixture with a solvent and drying a resulting mixture to obtain the carbonaceous material.

For example, first, graphite may be added to an alkaline aqueous solution and stirred to obtain a mixture.

The alkaline aqueous solution may include a sodium hydroxide aqueous solution, a potassium hydroxide aqueous solution, or a combination thereof. For example, the alkaline aqueous solution may include a potassium hydroxide aqueous solution. The potassium hydroxide aqueous solution may contain about 5 wt % to about 40 wt % of potassium hydroxide based on 100 g of water. For example, the amount of potassium hydroxide in the potassium hydroxide aqueous solution may be from about 10 wt % to about 40 wt %, and in some embodiments, about 10 wt % to about 20 wt %, based on 100 g of water.

Next, the mixture may be washed with a solvent and then dried to obtain a carbonaceous material according to any of the above-described embodiments.

The solvent may be water. The drying may be performed at a temperature of about 60° C. t to about 90° C. For example, the drying may be performed at a temperature of about 70° C. to about 90° C. for about 12 hours to about 36 hours. In some embodiments, the above-described preparation method of the carbonaceous material may exclude a thermal treatment process to thereby reduce the amount of potassium hydroxide nanocrystals on (or at) a surface of the carbonaceous material. Using the carbonaceous material prepared according to embodiments of the methods described herein as an anode active material, a lithium battery may have improved capacity and charge/discharge characteristics such as lifetime characteristics.

One or more embodiments of the present disclosure will now be described in more detail with reference to the following examples. However, these examples are only for illustrative purposes and are not intended to limit the scope of the one or more embodiments of the present disclosure.

EXAMPLES (Preparation of Anode Active Material)

Example 1: Preparation of Anode Active Material

About 10 wt % of potassium hydroxide was added to about 100 g of deionized water and dissolved for about 1 hour to obtain a potassium hydroxide aqueous solution.

About 50 g of graphite (3HE, available from Shanshan Tech Co., Ltd., 99.9% or higher) was added to the potassium hydroxide aqueous solution and stirred for about 20 hours while the temperature was maintained at about 80° C. to obtain a mixture. The mixture was then washed with deionized water and dried in an oven at about 80° C. for about 24 hours to thereby prepare an etched porous carbonaceous material as an anode active material, the etched porous carbonaceous material being a single body including a graphite core and an amorphous carbonaceous material shell.

The amount of potassium cations ($K^+$) in (or on or at) a surface of the etched porous carbonaceous material was about 0.0023 wt % based on a total weight of the etched porous carbonaceous material.

Example 2: Preparation of Anode Active Material

An anode active material was prepared in the same manner as described with respect to Example 1, except that about 20 wt % of potassium hydroxide was added to about 100 g of deionized water.

The amount of potassium cations ($K^+$) in (or on or at) a surface of the etched porous carbonaceous material was about 0.0025 wt % based on a total weight of the etched porous carbonaceous material.

Example 3: Preparation of Anode Active Material

An anode active material was prepared in the same manner as described with respect to Example 1, except that about 40 wt % of potassium hydroxide was added to about 100 g of deionized water.

The amount of potassium cations ($K^+$) in (or on or at) a surface of the etched porous carbonaceous material was about 0.0030 wt % based on a total weight of the etched porous carbonaceous material.

Comparative Example 1: Preparation of Anode Active Material

Graphite (3HE, available from Shanshan Tech Co., Ltd., 99.9% or higher) as it is was used as an anode active material.

Comparative Example 2: Preparation of Anode Active Material

About 10 wt % of potassium hydroxide was added to about 100 g of deionized water and dissolved for about 1 hour to obtain a potassium hydroxide aqueous solution.

About 50 g of graphite (3HE, available from Shanshan Tech Co., Ltd., 99.9% or higher) was added to the potassium hydroxide aqueous solution and stirred for about 20 hours while the temperature was maintained at about 80° C. to obtain a mixture. After a temperature increase at a rate of about 10° C./min under nitrogen atmosphere to about 800° C., the mixture was thermally treated at about 800° C. for about 1 hour and then washed with deionized water. The resulting washed product was dried in an oven at about 80° C. for about 24 hours to thereby prepare an etched porous carbonaceous material as an anode active material.

The amount of potassium cations ($K^+$) in (or on or at) a surface of the etched porous carbonaceous material was about 0.0100 wt % based on a total weight of the etched porous carbonaceous material.

(Manufacture of Lithium Secondary Battery (Coin Full Cell))

Example 4: Manufacture of Lithium Secondary Battery (Coin Full Cell)

The anode active material of Example 1, carbon black, carboxymethyl cellulose (CMC), and styrene-butadiene rubber (SBR) were mixed using a mixer to prepare an anode active material composition. A mixed weight ratio of the anode active material, CMC, and SBR in the anode active material composition was about 98:0.8:1.2.

The anode active material composition was coated on a copper foil (having a thickness of about 10 μm) using a doctor blade, dried at about 25° C., and then further dried in a vacuum at about 120° C. to thereby manufacture an anode.

$Li(Ni_{0.6}Co_{0.2}Mn_{0.2})O_2$ and $Li(Ni_{0.8}Co_{0.15}Al_{0.5})O_2$ (mixed weight ratio=3:7) as cathode active materials, a conducting agent (Super-P, available from Timcal Ltd.), polyvinylidene fluoride (PVdF), and N-pyrrolidone were mixed together to obtain a cathode active material composition. A mixed weight ratio of the cathode active materials, conducting agent, and PVDF in the cathode active material composition was about 94:3:3.

The cathode active material composition was coated on an aluminum foil (having a thickness of about 15 μm), dried at about 25° C., and then further dried in a vacuum at about 110° C. to thereby manufacture a cathode.

An electrolyte was disposed between the cathode and the anode manufactured as described above to thereby manufacture a lithium secondary battery (coin full cell). In this regard, after disposing a polyethylene/polypropylene separator between the cathode and the electrolyte, a liquid electrolyte was added thereto. The liquid electrolyte was prepared by dissolving 1.15M $LiFP_6$ as a lithium salt in a mixed solvent of ethylene carbonate, diethyl carbonate, ethylmethyl carbonate (EMC) in a volume ratio of about 2:2:4.

Examples 5 and 6: Manufacture of Lithium Secondary Battery (Coin Full Cell)

Lithium secondary batteries were prepared in the same manner as described with respect to Example 4, except that the anode active materials of Examples 2 and 3, instead of the anode active material of Example 1, were used, respectively.

Comparative Examples 3 and 4: Manufacture of Lithium Secondary Battery (Coin Full Cell Lithium secondary batteries were prepared in the same manner as described with respect to Example 4, except that the anode active materials of Comparative Examples 1 and 2, instead of the anode active material of Example 1, were used, respectively.
(Analysis of Anode Active Materials and Anodes)

Analysis Example 1: Analysis of Anode Active Material by Scanning Electron Microscopy (SEM) and Time-of-Flight Secondary Ion Mass Spectroscopy (TOF-SIMS)

1-1: Scanning Electron Microscopy (SEM)

The anode active material of Example 1 was observed by SEM at 10,000×, 100,000×, and 200,000× magnifications, and the anode active material of Comparative Example 1 was observed by SEM at 10,000× and 200,000× magnifications. The results are shown in FIGS. 3A-3E, respectively.

Figure 3A:
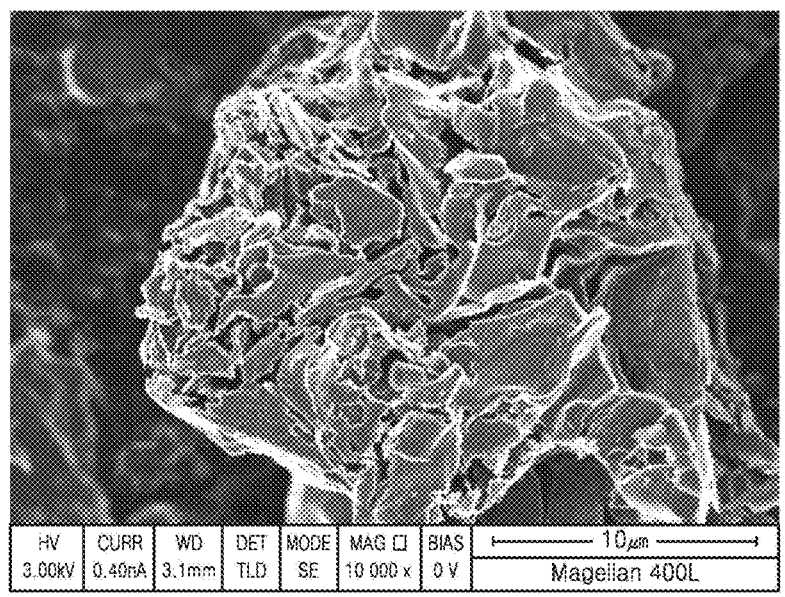
FIGS. 3A-3C are scanning electron microscopic (SEM) images of an anode active material of Example 1 at 10,000×, 100,000×, and 200,000× magnifications, respectively.
Figure 3B:
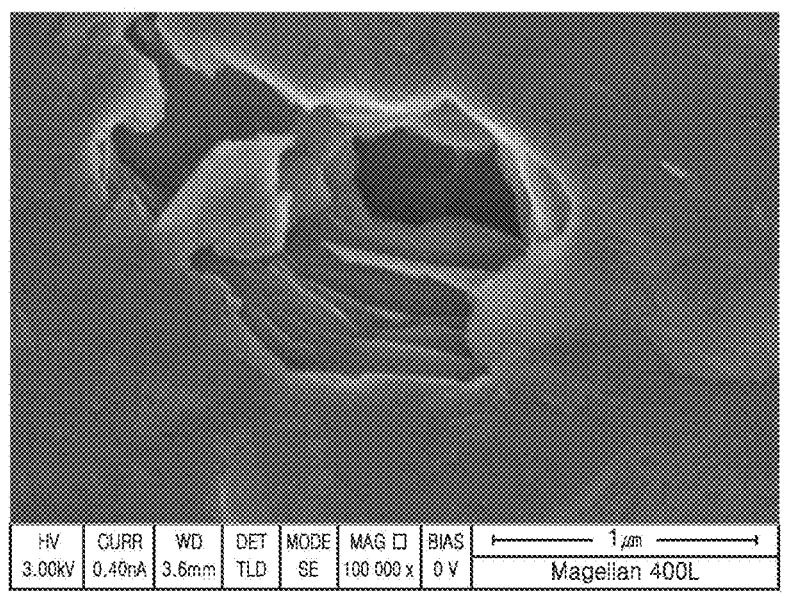
Figure 3C:
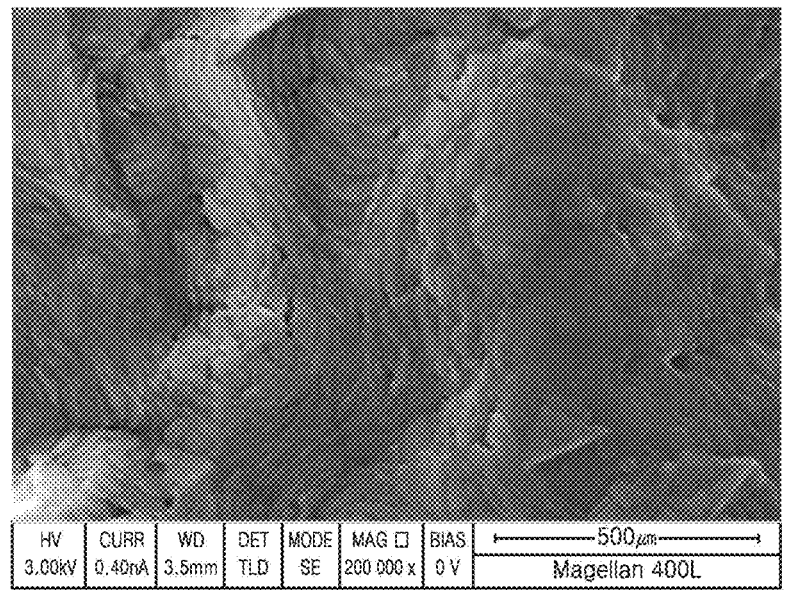

Referring to FIGS. 3A-3C, the anode active material of Example 1 was found to be an etched porous carbonaceous material having a plurality of micropores extending inwards from a surface thereof and nanoholes on (or at) the surface.

Figure 3D:
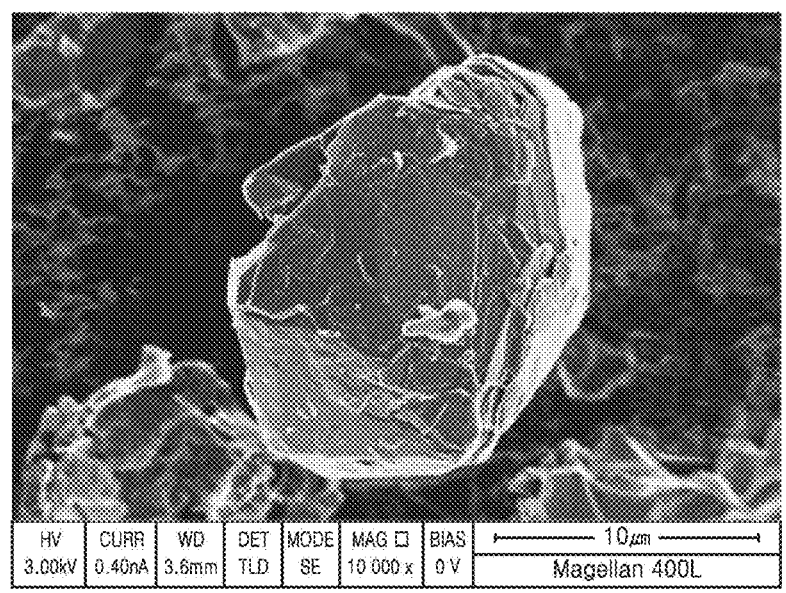
FIGS. 3D-3E are SEM images of an anode active material of Comparative Example 1 at 10,000× and 200,000× magnifications, respectively.
Figure 3E:
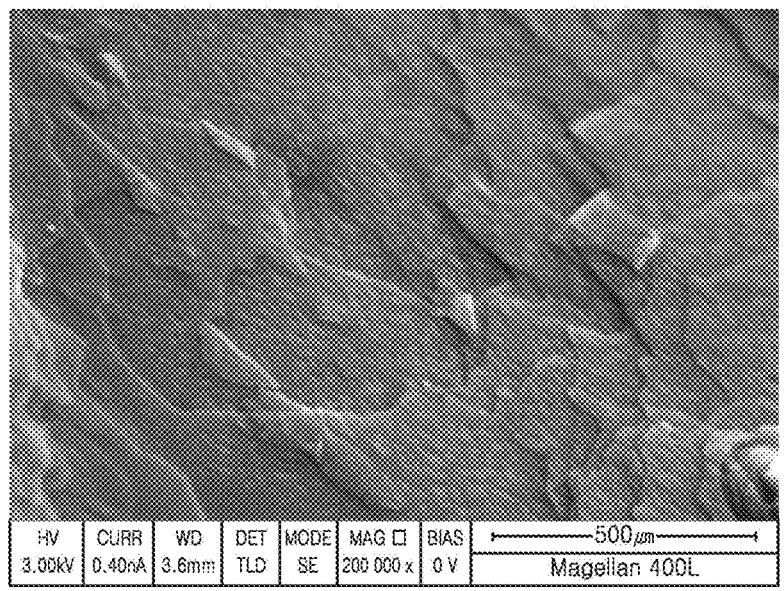

Referring to FIGS. 3D-3E, the anode active material of Comparative Example 1 was found to be a carbonaceous material having no pores or nanoholes.

1-2: Time-of-Flight Secondary Ion Mass Spectroscopy (TOF-SIMS)

Surfaces of the anode active materials of Example 1, Comparative Example 1, and Comparative Example 2 were observed by time-of-flight secondary ion mass spectroscopy (TOF-SIMS). The results are shown in FIGS. 4A-4C, respectively.

The TOF-SIMS analysis was performed by rastering a 25 keV $Bi^{q+}$ source (q=1) over a 250×250 $\mu m^2$ area with a current of 1 pA.

Figure 4A:
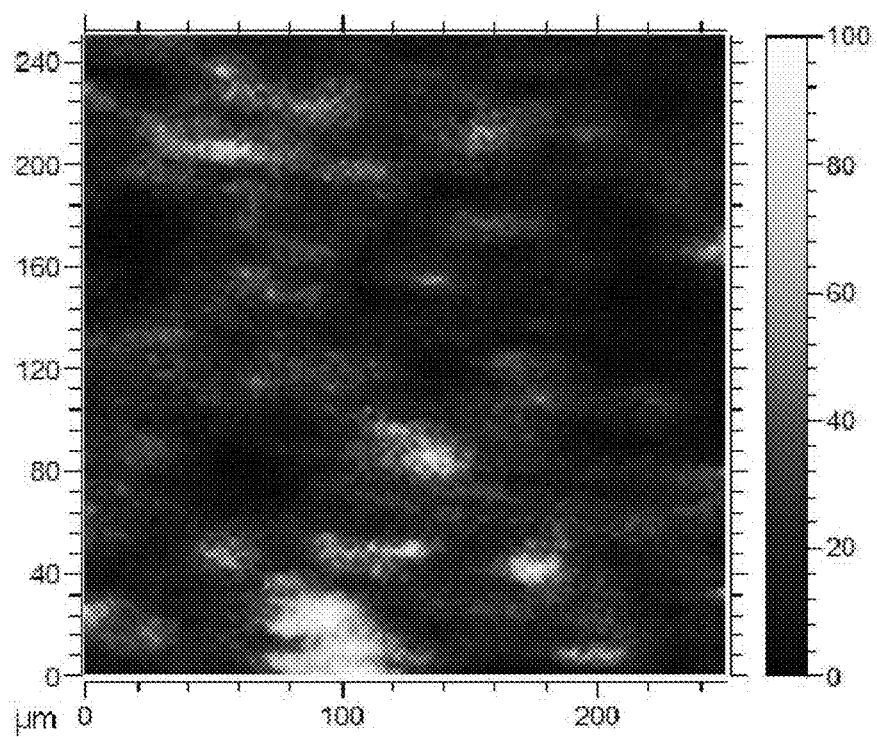
FIGS. 4A-4C are surface images of anode active materials of Example 1, Comparative Example 1, and Comparative Example 2, observed by time-of-flight secondary ion mass spectroscopy (TOF-SIMS)
Figure 4B:
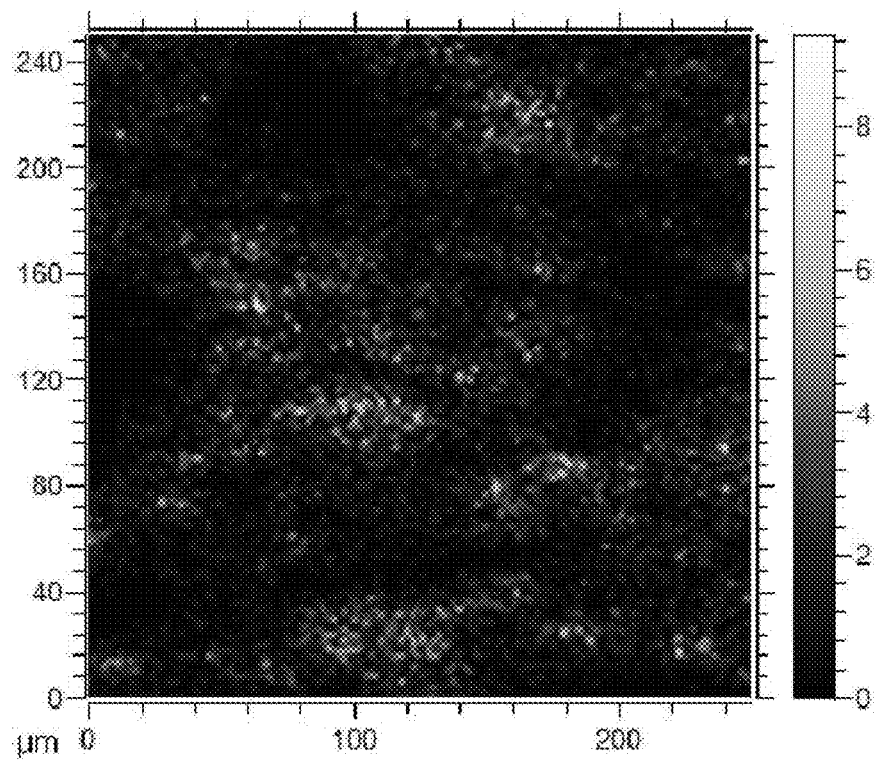
Figure 4C:
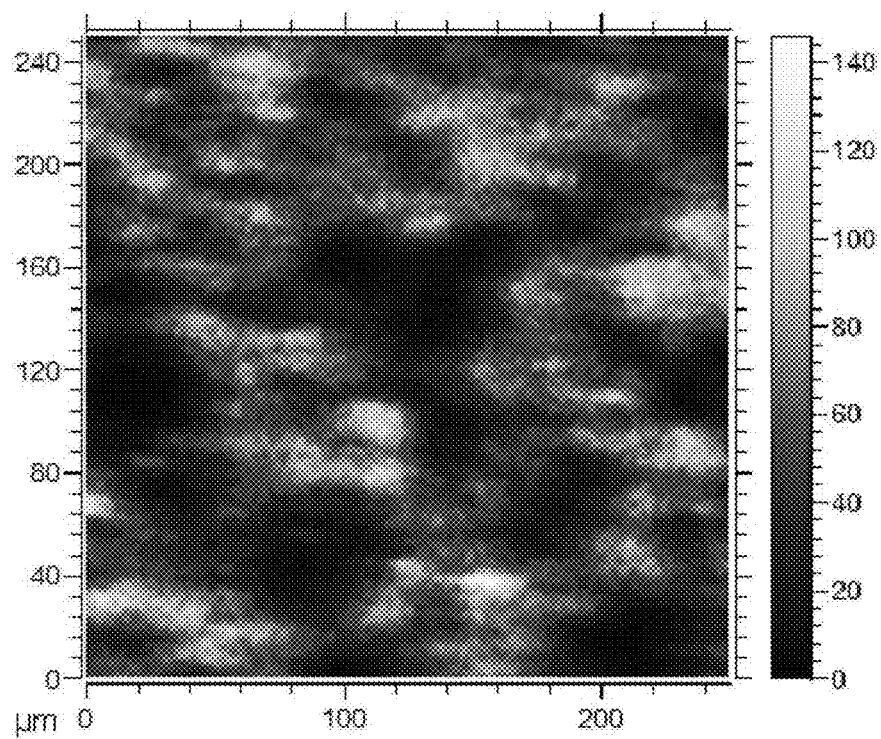

Referring to FIGS. 4A-4C, the amount of potassium cations ($K^+$) remaining on (or at) the surface of the anode active material of Example 1 was found to be larger than that of the anode active material of Comparative Example 1 and smaller than that of the anode active material of Comparative Example 2.

Figure 5:
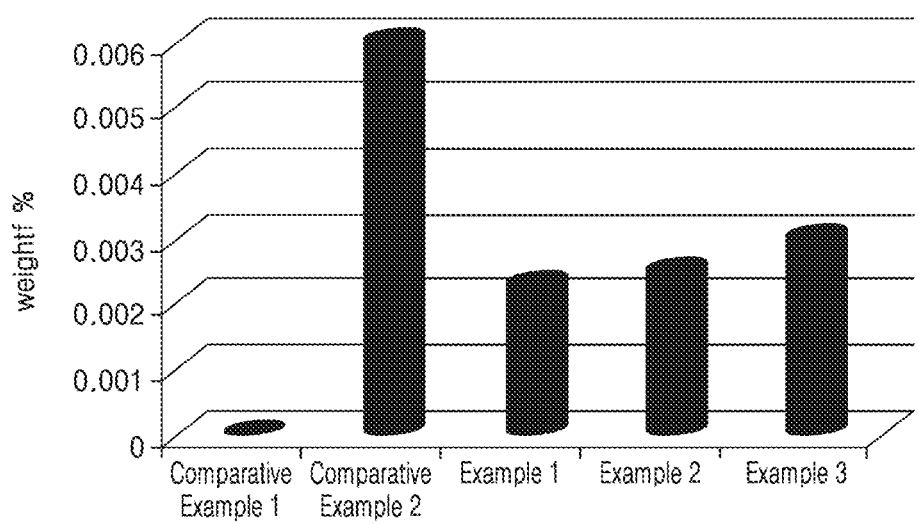
FIG. 5 is a graph of relative detection amount of potassium cations ($K^+$) to a total ion count on (or at) the surface of each of the anode active materials of Examples 1 to 3 and Comparative Example 1.

Relative detection amounts of potassium cations ($K^+$) to total ion counts on (or at) the surfaces of the anode active materials of Examples 1, 2, and 3 and Comparative Example 1 are shown in FIG. 5 and Table 1.

TABLE 1

| Example | Relative detection amount of potassium cations ($K^+$) to total ion count on (or at) the surface of anode active material (wt %) |
|---|---|
| Example 1 | 0.0023 |
| Example 2 | 0.0025 |
| Example 3 | 0.0030 |
| Comparative Example 1 | 0 |

Referring to FIG. 5 and Table 1, the relative detection amounts of potassium cations ($K^+$) to total ion count on (or at) the surface of the anode active material was larger in the order of the anode active materials of Example 2, Example 3, and Example 1. No potassium cation ($K^+$) was detected as being present on (or at) the surface of the anode active material of Comparative Example 1.

Analysis Example 2: Anode Surface Analysis by SEM

The lithium secondary batteries of Example 4 and Comparative Example 4 were each charged and discharged at room temperature continuously with a rate of 0.1 C ($1^{st}$ cycle), 0.5 C ($2^{nd}$ cycle), 1.0 C ($3^{rd}$ cycle), 2.0 C ($4^{th}$ cycle), and 2.5 C ($5^{th}$ cycle) in a cut-off voltage range of about 3.0V to about 4.25V, followed by 50 times of repeated charging and discharging at 2.5 C. The lithium secondary batteries were disassembled to observe the surface of each anode by SEM at 2,000× magnification. The results are shown in FIGS. 6A-6B, respectively.

Figure 6A:
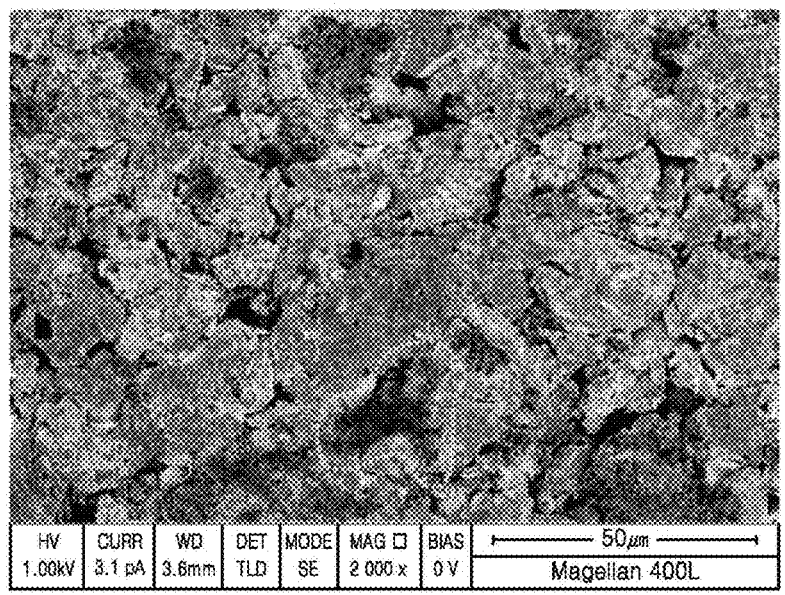
FIGS. 6A-6B are SEM images at 2,000× magnification of surfaces of the anodes separated from the lithium secondary batteries of Example 4 and Comparative Example 4, respectively, after the $50^{th}$ cycle of charging and discharging in a cut-off voltage range of about 3.0V to about 4.25V.
Figure 6B:
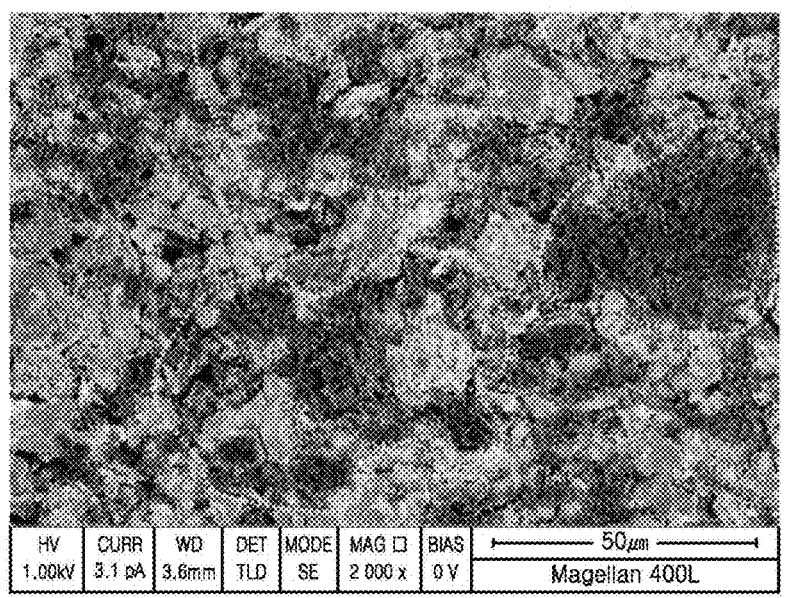

Referring to FIGS. 6A-6B, the lithium secondary battery of Example 4 was found to include a smaller lithium plating area of interconnected lithium ions (denoted by dotted lines), compared to the lithium secondary battery of Comparative Example 4, indicating that the lithium secondary battery of Example 4 have improved charge/discharge characteristics in terms of rate characteristics, rapid charging rate characteristics, and lifetime characteristics, compared to those of the lithium secondary battery of Comparative Example 4.

Analysis Example 3: Structure Analysis of Anode Active Material by Transmission Electron Microscopy (TEM), X-Ray Diffraction (XRD), and Raman Spectroscopy 3-1: TEMHRTEM Surfaces of the anode active materials of Example 1 and Comparative Example 1 were analyzed by high-resolution transmission electron microscopy HRTEM. The results are shown in FIGS. 7A-7B, respectively.

Figure 7A:
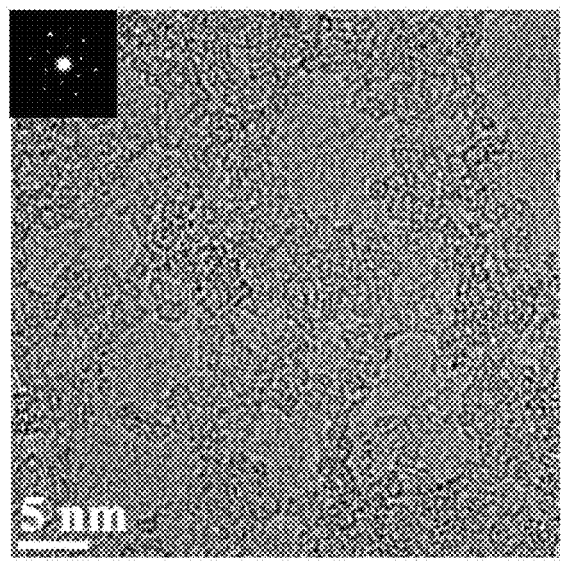
FIGS. 7A-7B are high-resolution transmission electron microscopic (HRTEM) images of surfaces of the anode active materials of Example 1 and Comparative Example 1, respectively.
Figure 7B:
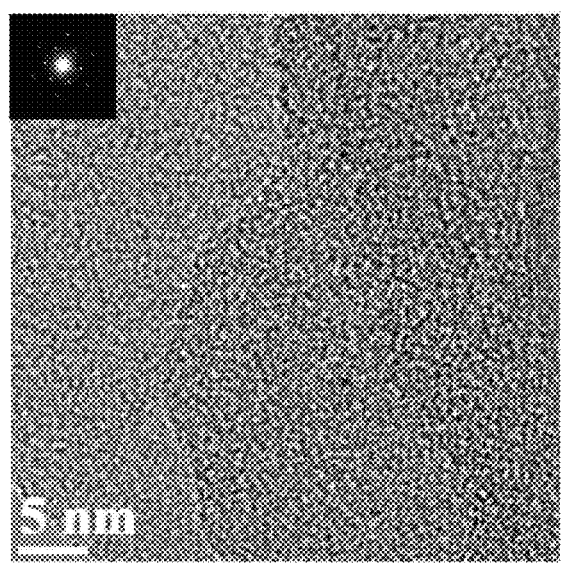

Referring to FIGS. 7A-7B, the anode active material of Example 1 was found to have a structure including more nanoholes compared to the anode active material of Comparative Example 1.

Figure 8A:
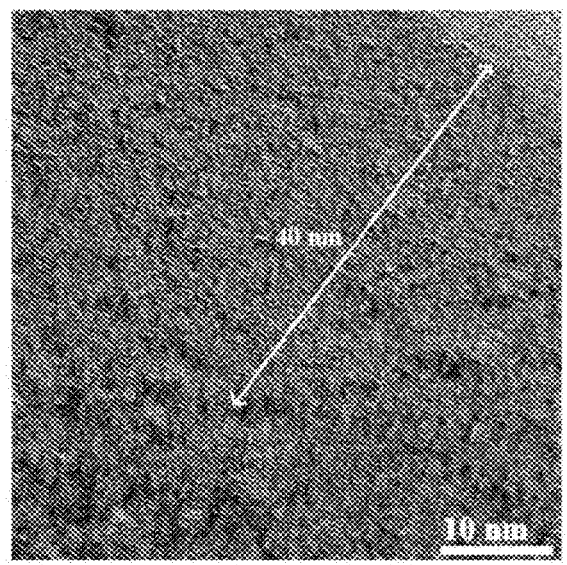
FIGS. 8A-8B are HRTEM images of cross-sectional structures of the anode active material of Example 1.
Figure 8B:
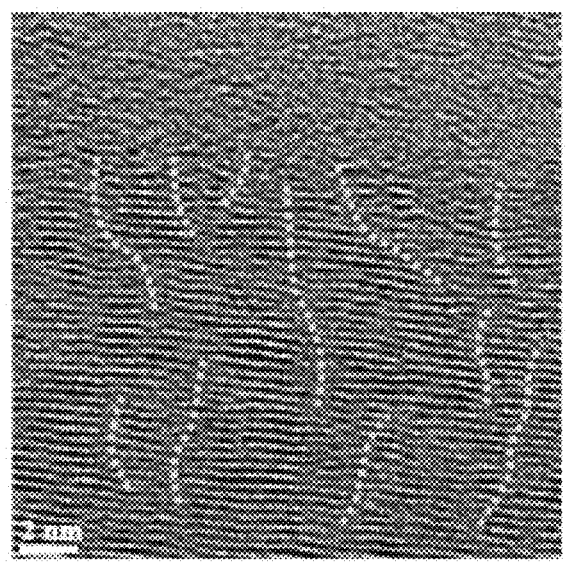
Figure 8C:
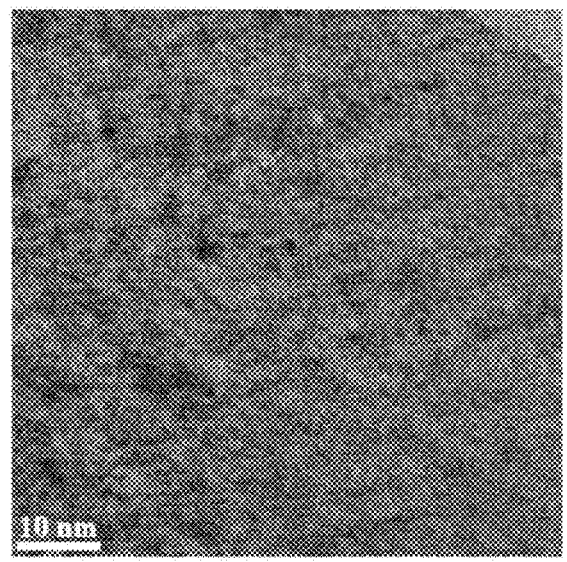
FIGS. 8C-8D are HRTEM images of cross-sectional structures of the anode active material of Comparative Example 1.
Figure 8D:
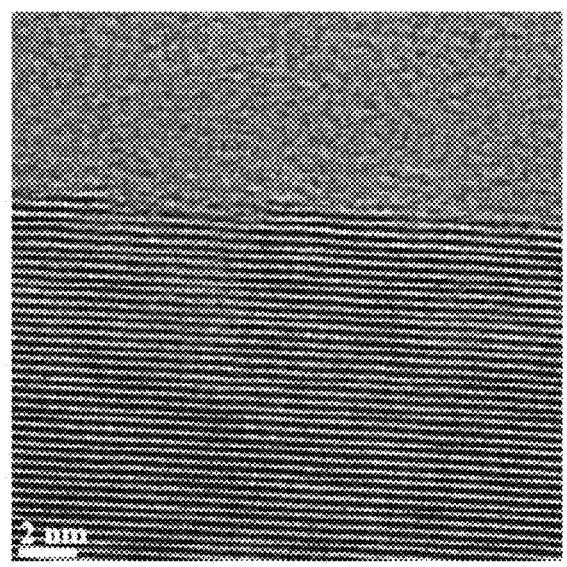

Cross-sectional structures of the anode active materials of Example 1 and Comparative Example 1 were also analyzed by HRTEM. The results are shown in FIGS. 8A-8D. FIGS. 8A-8B are TEM images of cross-sectional structures of the anode active material of Example 1, and FIGS. 8C-8D are TEM images of cross-sectional structures of the anode active material of Comparative Example 1.

Referring to FIGS. 8A-8B, the anode active material of Example 1 was found to include nanoholes (denoted by yellow dotted lines) on the surface and an amorphous structure resulting from etching with KOH, the amorphous structure extending from the surface to a depth of about 40 nm toward the core. A detailed shape of the amorphous structure can be seen in FIG. 8B.

Referring to FIGS. 8C-8D, the anode active material of Comparative Example 1 was found to include a regularly ordered structure of graphite layers.

The results indicate that the anode active material of Example 1 is better for intercalation/deintercalation of lithium ions during charging and discharging than the anode active material of Comparative Example 1.

3-2: XRD

The anode active materials of Examples 1 to 3 and Comparative Example 1 were analyzed by X-ray diffraction (XRD) analysis. The results are shown in FIG. 9.

Figure 9:
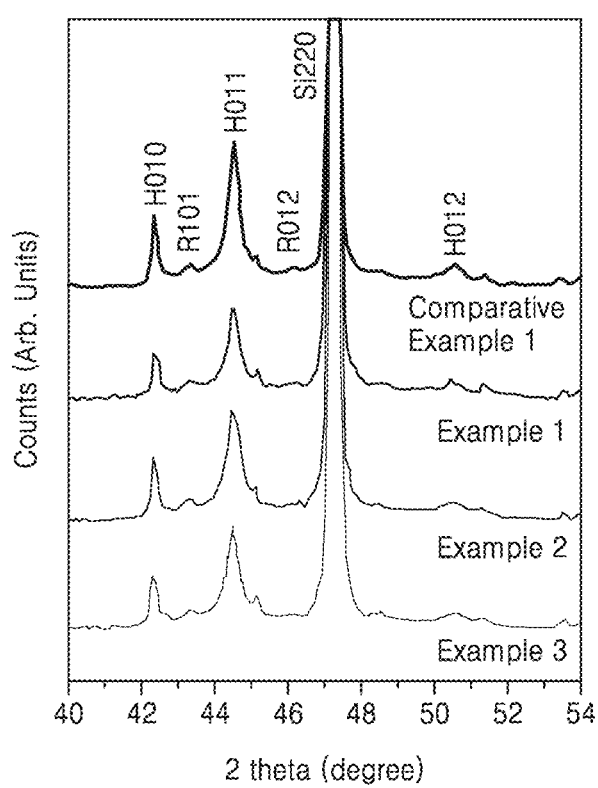
FIG. 9 is a graph illustrating the results of X-ray diffraction (XRD) analysis on the anode active materials of Examples 1 to 3 and Comparative Example 1.

Referring to FIG. 9, the anode active materials of Examples 1 to 3 and Comparative Example 1 were found to have peaks of R101 and R102 planes with rhombohedral phase at a Bragg angle of about 43.5° and about 46.5°, respectively, indicating that there occurred no detectable change in crystalline structure of the anode active material by etching with KOH.

As a result of Rietveld refinement analysis based on the XRD data, an interplanar spacing ($d_{002}$) of the (002) plane was about 3.355 Å in the anode active materials of Examples 1 to 3 and Comparative Example 1.

3-3: Raman Spectroscopy

Figure 10:
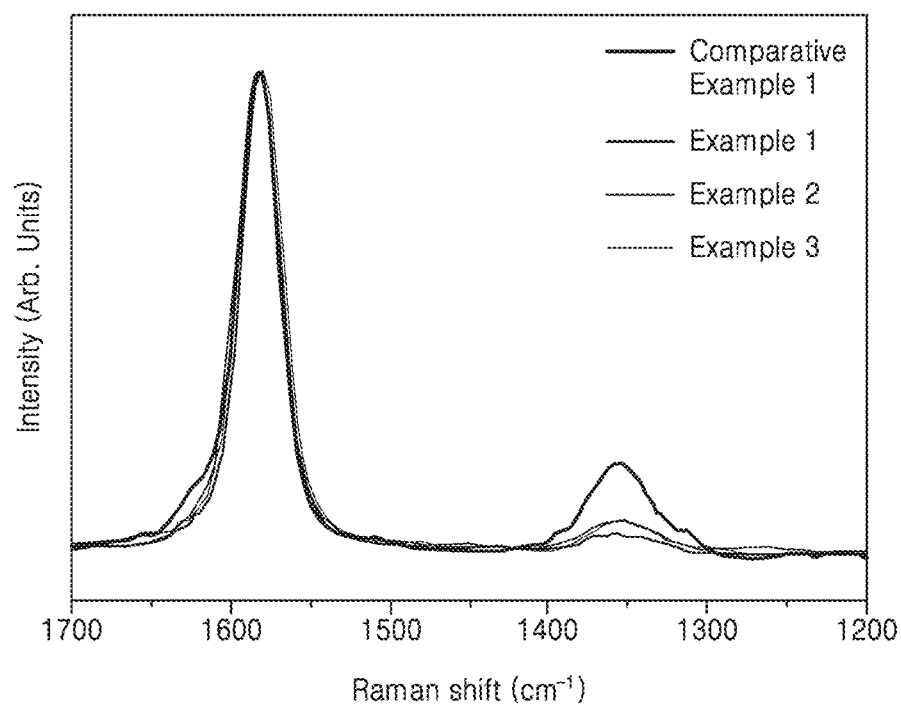
FIG. 10 is a graph illustrating the results of Raman spectroscopy on the anode active materials of Examples 1 to 3 and Comparative Example 1.

The anode active materials of Examples 1 to Example 3 and Comparative Example 1 were analyzed by Raman spectroscopy. The results are shown in FIG. 10. The ratio of intensities of D peak to G peak (D/G, an intensity ratio of D peak at about 1360 $cm^{-1}$ to G peak at about 1580 $cm^{-1}$) was obtained based on the results of FIG. 10, and the results are shown in Table 3.

The Raman spectroscopy was performed using a Raman spectrometer (NRS-1000, available from JASCO) with a laser system (532 nm) at a spatial resolution of about 500 nm.

TABLE 3

| Example | Ratio of intensities of D peak to G peak (D/G) |
| --- | --- |
| Example 1 | 0.08 |
| Example 2 | 0.10 |
| Example 3 | 0.12 |
| Comparative Example 1 | 0.14 |

Referring to FIG. 10 and Table 3, the anode active materials of Examples 1 to 3 were found to have a lower intensity ratio of D peak to G peak (D/G), compared to the anode active material of Comparative Example 1.

Analysis Example 4: Specific Surface Area Analysis of Anode Active Materials Specific surface areas of the anode active materials of Example 1, Example 2, and Comparative Example 1 were calculated using the Brunauer, Emmett and Teller (BET) method. The results are shown in Table 4.

TABLE 4

| Example | Specific surface area ($m^2/g$) |
| --- | --- |
| Example 1 | 8.05 |
| Example 2 | 7.42 |
| Comparative Example 1 | 6.23 |

Referring to Table 4, the anode active materials of Example 1 and Example 2 were found to have about 7.0 $m^2/g$ or greater, which was larger than the specific surface area of the anode active material of Comparative Example 1.

(Evaluation of Electrode Potential and Battery Performance)

Evaluation Example 1: Evaluation of Anode Potential

A potential at each of the anodes including the anode active materials of Example 1 and Comparative Example 1, respectively, was measured. The results are shown in FIG. 11.

The potential measurement was performed using a three-electrode cell including an electrode including the anode active material of Example 1 or Comparative Example 1 as a working electrode, lithium metal as a reference electrode, and lithium metal as a counter electrode. The electrolyte used included 1.15 M of $LiPF_6$.

Figure 11:
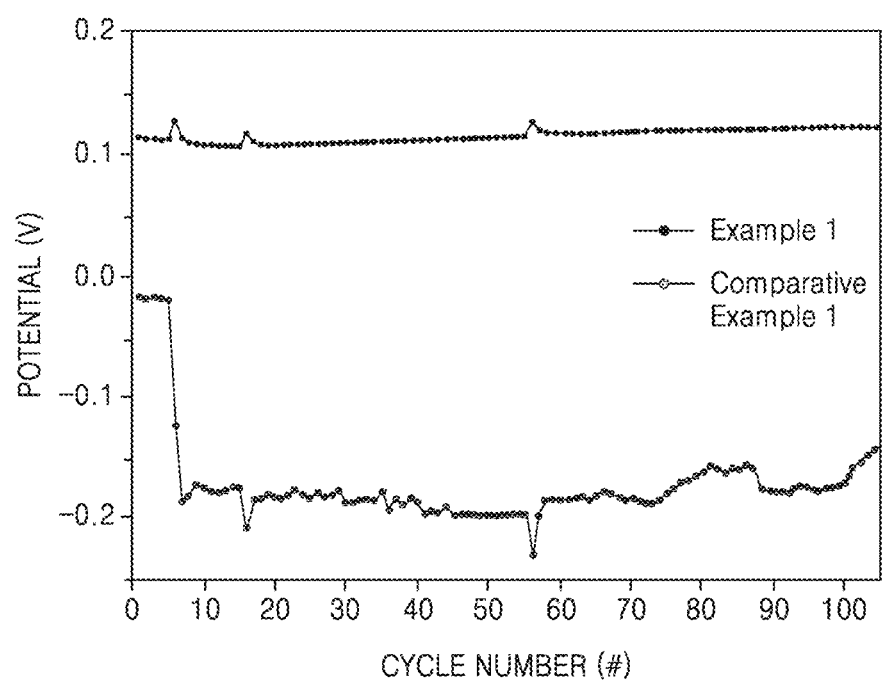
FIG. 11 is a graph of anode potential with respect to cycle number in an anode including the anode active material of Example 1 and an anode including the anode active material of Comparative Example 1 by using a three-electrode cell.

Referring to FIG. 11, the anode including the anode active material of Example 1 was found to have a positive (+) potential, unlike the anode including the anode active material of Comparative Example 1, indicating that the anode of the anode active material of Example 1 has a reduced lithium plating area of interconnected lithium ions on the surface thereof.

Evaluation Example 2: Evaluation of Charge/Discharge Characteristics

Charge/discharge characteristics of the coin full cells of Examples 4 to 6 and Comparative Example 3 were evaluated using a charging/discharging apparatus (Model: HC1005R, available from HNT Co., Ltd.).

2-1: Evaluation of Rate Characteristics and Rapid Charging Rate Characteristics

Figure 12A:
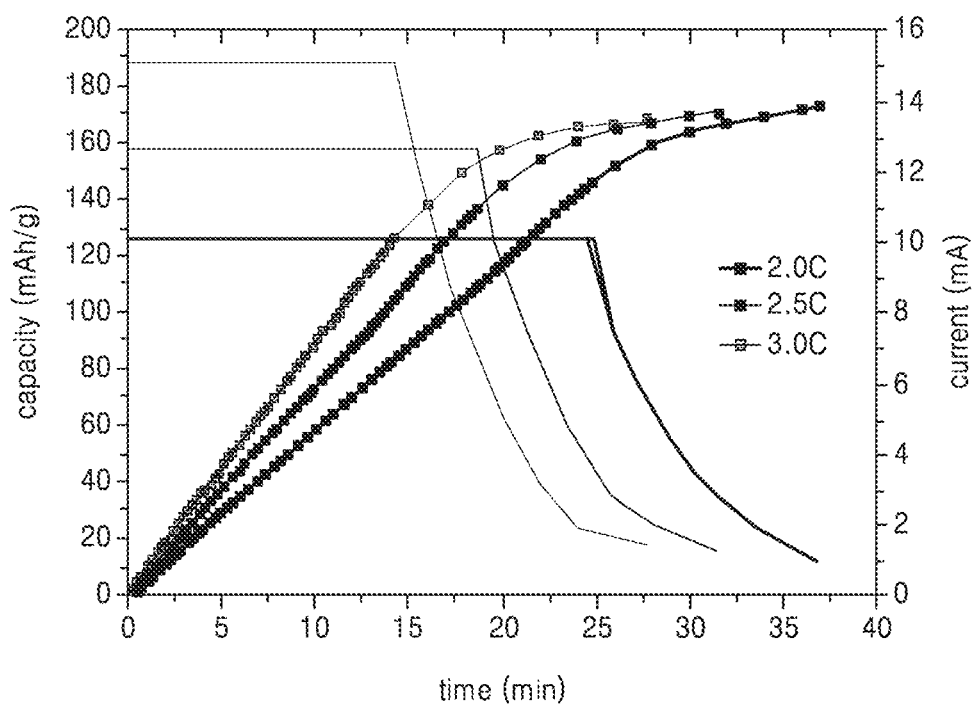
FIGS. 12A-12B are graph of capacity with respect to charging time at 2.0° C., 2.5° C., and 3.0° C. in the lithium secondary batteries of Example 4 and Comparative Example 3, respectively.
Figure 12B:
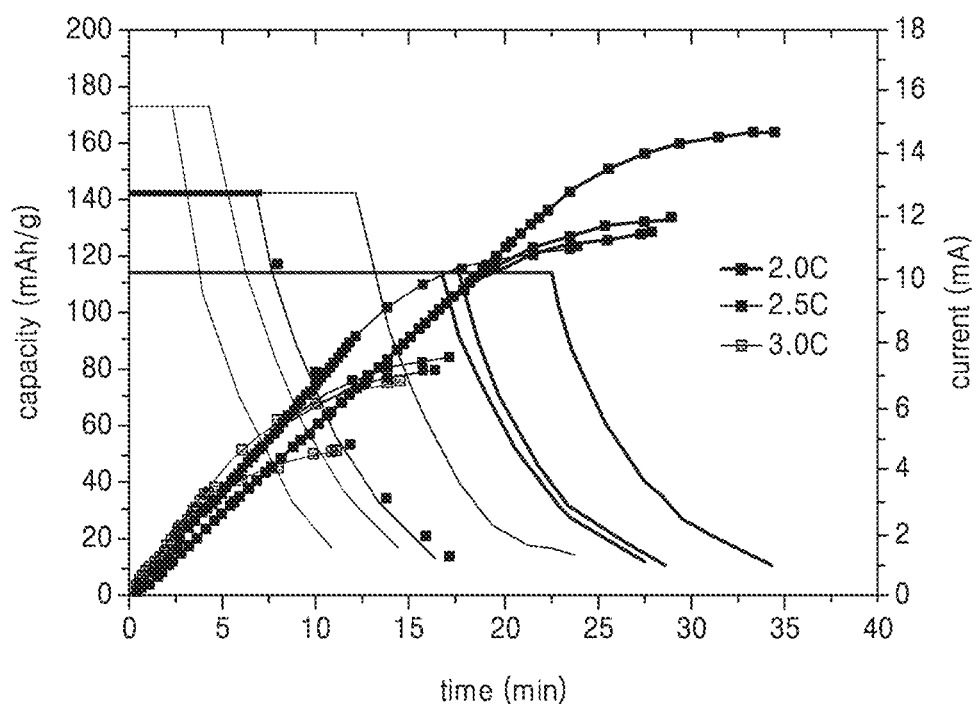

A charging/discharging test at room temperature with 0.1 C, 0.5 C, 1.0 C, 2.0 C, 2.5 C, and then 3.0 C in a cut-off voltage range of about 3.0V to about 4.25V was continuously performed three times on each of the lithium secondary batteries of Examples 4 to 6 and Comparative Example 3 to evaluate capacity with respect to time. The results from the charging/discharging test on the lithium secondary batteries of Example 4 and Comparative Example 3 are shown in FIGS. 12A-12B, respectively. The results of measuring capacity with respect to C-rate are shown in FIG. 13.

Referring to FIGS. 12A-12B, the lithium secondary battery of Example 4 was found to have an increased capacity chargeable within a given time, compared to the lithium secondary battery of Comparative Example 3.

Figure 13:
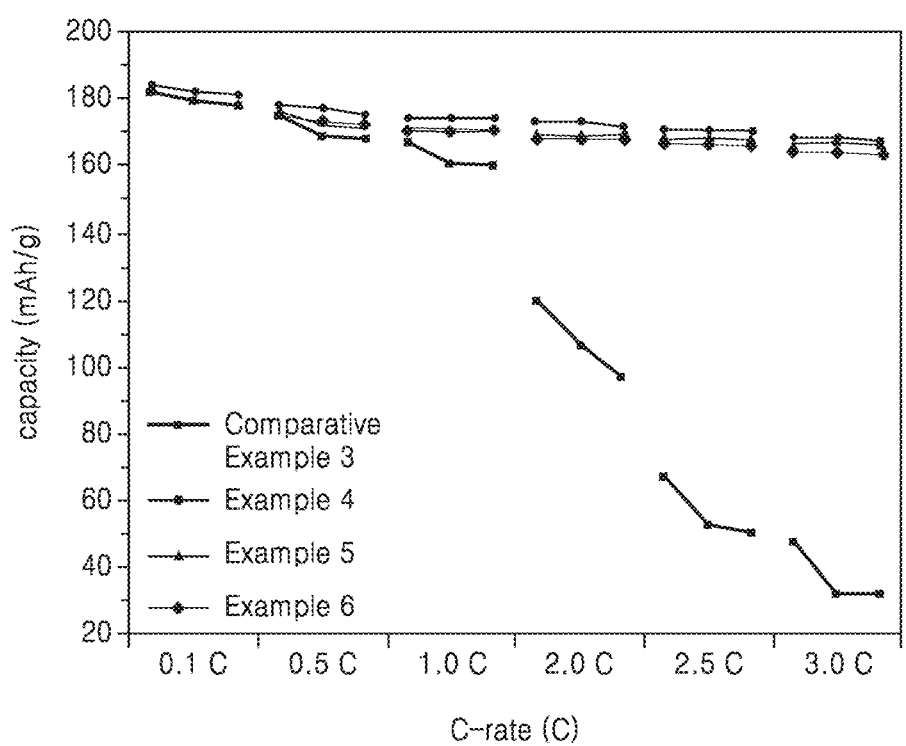
FIG. 13 is a graph of capacity with respect to C-rate in the lithium secondary batteries of Examples 4 to 6 and Comparative Example 3.

Referring to FIG. 13, the lithium secondary batteries of Examples 4 to 6 were found to have nearly no change (e.g., no detectable change) in capacity even at 1.0 C or greater, while the lithium secondary battery of Comparative Example 3 was found to undergo a distinct capacity reduction at 1.0 C or greater.

2-2: Evaluation of Lifetime Characteristics

Figure 14:
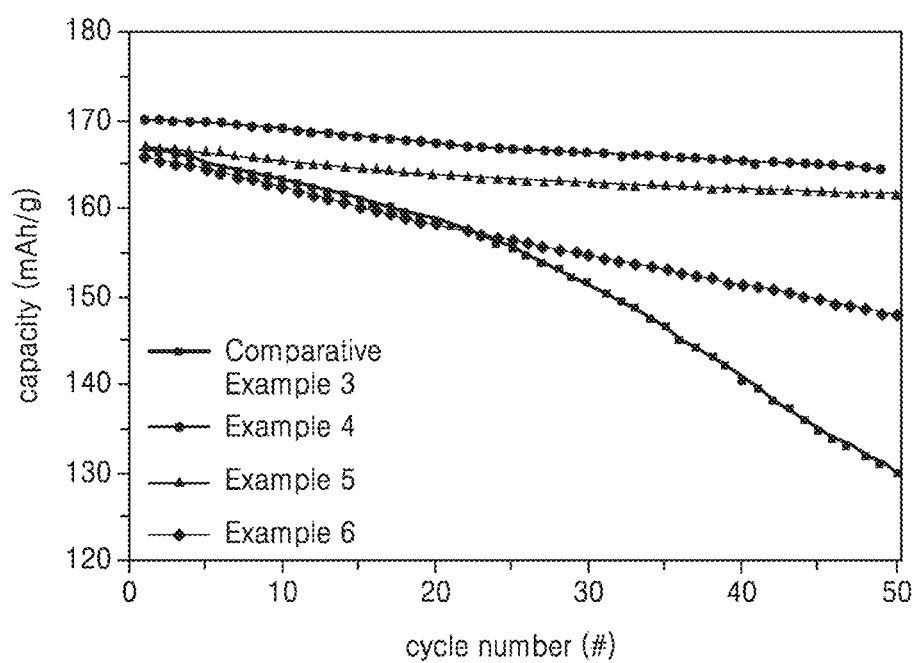
FIG. 14 is a graph of capacity with respect to cycle number in the lithium secondary batteries of Examples 4 to 6 and Comparative Example 3.

To evaluate lifetime characteristics, the lithium secondary batteries of Examples 4 to 6 and Comparative Example 3 were each subjected to three times of a charging/discharging cycle at room temperature with 0.1 C in a cut-off voltage range of about 3.0V to about 4.25V, continuously followed by 50 times of a charging/discharging cycle at 2.5 C. The results are shown in FIG. 14. The lifetime characteristics of the lithium secondary batteries were evaluated based on capacity retentions (%) thereof calculated using Equation 2. The results are shown in Table 5.

Capacity retention (%)=[(Discharge capacity at $53^{th}$ cycle/Discharge capacity at $4^{th}$ cycle)]×100  [Equation 2]

TABLE 5

| Example | Capacity (mAh/g) | Capacity retention (%) |
| --- | --- | --- |
| Example 4 | 164.69 | 96.7 |
| Example 5 | 161.57 | 96.6 |
| Example 6 | 147.78 | 89.0 |
| Comparative Example 3 | 139.91 | 78.2 |

Referring to FIG. 14 and Table 5, the lithium secondary batteries of Examples 4 to 6 were found to have improved capacities and capacity retentions, compared to those of the lithium secondary battery of Comparative Example 3.

As described above, according to the one or more embodiments of the present disclosure, a carbonaceous material may be a single body including a graphite core and an amorphous carbonaceous shell, and a lithium battery including the carbonaceous material as an anode active material may have improved capacity and improved charge/discharge characteristics in terms of rate characteristics, rapid charging rate characteristics, and lifetime characteristics.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims, and equivalents thereof.

What is claimed is:

1. A carbonaceous material comprising:
a core comprising graphite; and
a shell on the core and comprising an amorphous carbonaceous material,
wherein the carbonaceous material is a single body, and
wherein the amount of potassium cations ($K^+$) at the surface of the carbonaceous material is from about 0.001 wt % to about 0.003 wt % based on a total weight of the carbonaceous material.

2. The carbonaceous material of claim 1, wherein the carbonaceous material is an etched porous carbonaceous material.

3. The carbonaceous material of claim 1, wherein the carbonaceous material comprises a plurality of micropores.

4. The carbonaceous material of claim 1, wherein the carbonaceous material comprises one or more nanoholes in a surface thereof.

5. The carbonaceous material of claim 1, wherein the carbonaceous material comprises a potassium hydroxide nanocrystal at a surface thereof.

6. The carbonaceous material of claim 5, wherein the carbonaceous material has a surface pKa value of about 11 or greater.

7. The carbonaceous material of claim 1, wherein the carbonaceous material has a Brunauer-Emmett-Teller (BET) specific surface area of about 6.0 to about 10.0 $m^2/g$.

8. The carbonaceous material of claim 1, wherein a ratio of intensities of a D peak at about 1360 $cm^{-1}$ to a G peak at about 1580 $cm^{-1}$ (D/G) in a Raman spectrum of the carbonaceous material is about 0.04 to about 0.14.

9. The carbonaceous material of claim 1, wherein the carbonaceous material has an interplanar spacing ($d_{002}$) of the (002) plane of about 3.350 Å to about 3.355 Å, as measured by X-ray diffraction analysis.

10. An anode active material comprising the carbonaceous material according to claim 1.

11. A lithium battery comprising:
an anode comprising the anode active material of claim 10;
a cathode; and
an electrolyte located between the anode and the cathode.

12. A method of preparing a carbonaceous material, the method comprising:
adding graphite to an alkaline aqueous solution and stirring a resulting solution to obtain a mixture; and
washing the mixture with a solvent and drying a resulting mixture to obtain the carbonaceous material of claim 1.

13. The method of claim 12, wherein the carbonaceous material is an etched porous carbonaceous material.

14. The method of claim 12, wherein the alkaline aqueous solution comprises a potassium hydroxide aqueous solution.

15. The method of claim 14, wherein an amount of potassium hydroxide in the potassium hydroxide aqueous solution is about 5 wt % to about 40 wt % based on 100 g of water.

16. The method of claim 12, wherein the drying is performed at a temperature of about 60° C. to about 90° C.

\* \* \* \* \*